INVENTORS
LOUIS F. SCHAEFER AND
ALBERT MACOVSKI
BY
[signature]
ATTORNEY

INVENTORS
LOUIS F. SCHAEFER AND
ALBERT MACOVSKI
BY
ATTORNEY

United States Patent Office 3,037,071

Patented May 29, 1962

3,037,071

AUTOMATIC CHROMA CONTROL OF VIDEO AMPLIFIER WITH EFFECT LIMITED TO CHROMA COMPONENTS

Louis F. Schaefer, Lynbrook, and Albert Macovski, Massapequa, N.Y., assignors to Radio Corporation of America, a corporation of Delaware Filed Nov. 1, 1956, Ser. No. 619,838

9 Claims. (Cl. 178—5.4)

This invention relates to a video amplifier wherein the gain of the high frequency amplifier circuits may be electrically varied. The invention is particularly useful in color television receivers for amplifying both the low frequency luminance signal and high frequency chrominance and color subcarrier burst signals, with electrical control of the gain of the high frequency amplifier components in response to an automatic chroma control voltage.

In color television receivers for receiving color signals in accordance with the standards established in the United States by the Federal Communications Commission, the video signal is commonly divided into two channels, one channel amplifying the luminance signal and the other channel amplifying the chrominance and color subcarrier burst signals. The luminance channel is coupled to the cathode of the color kinescope. The chrominance channel is coupled to synchronous demodulators having outputs coupled through a matrix to the grids of the kinescope. The color subcarrier bursts are derived from the chrominance channel and used to control an oscillator having outputs coupled to the synchronous demodulators. An automatic chroma control voltage, which is inversely proportional to the amplitude of the bursts, is applied to the chrominance channel to control the gain of the chrominance signal.

The video signal, including both the luminance and chrominance information, may be amplified in a single channel, rather than being amplified in two separate channels. If all the amplification of the luminance and chrominance signals is performed in a single channel, some means should be provided for controlling the amplitude of the chrominance signal in response to an automatic chroma control voltage, without affecting the luminance signal. It is therefore a general object of this invention to provide an improved video amplifier wherein the amplification of the high frequency components may be electrically varied.

It is another object of this invention to provide a video amplified for use in a color television receiver wherein both the low frequency luminance portion of the video signal and the high frequency chrominance portion of the video signal are amplified and the amplitude of the chrominance signal is automatically controlled by an applied automatic chroma control voltage.

A video amplifier according to this invention may consist of a pentode vacuum tube having a control grid to which the color video input signal is applied. A low frequency luminance circuit is coupled between the screen grid and cathode of the vacuum tube. A high frequency chrominance circuit is coupled from the anode through the low frequency circuit to the cathode. The screen grid is therefore connected to an intermediate point between the high frequency chrominance and low frequency luminance circuits. An automatic chroma control voltage is applied to the suppressor grid of the vacuum tube to vary the division of current drawn by the anode and the screen grid. Current drawn by the anode passes through both the high frequency chrominance circuit and the low frequency luminance circuit, but the high frequency chrominance signal is developed solely across the high frequency circuit. Current drawn by the screen grid passes solely through the low frequency luminance circuit, and the low frequency luimnance signal is developed thereacross. Therefore, the luminance signal developed across the low frequency circuit is unaffected by the division of current drawn by the anode and screen grid. On the other hand, the chrominance signal developed across the high frequency circuit is proportional to the anode current. The automatic chroma control voltage applied to the suppressor grid thus controls solely the amplitude of the chrominance signal developed across the high frequency circuit. Means are provided to combine the chrominance signal developed across the high frequency circuit with the luminance signal developed across the low frequency circuit to provide a video output signal.

In order that the invention may be fully applied and the advantages thereof readily obtained in practice, special embodiments of the invention are described hereinafter with reference to the accompanying drawings in which.

Figure 1:
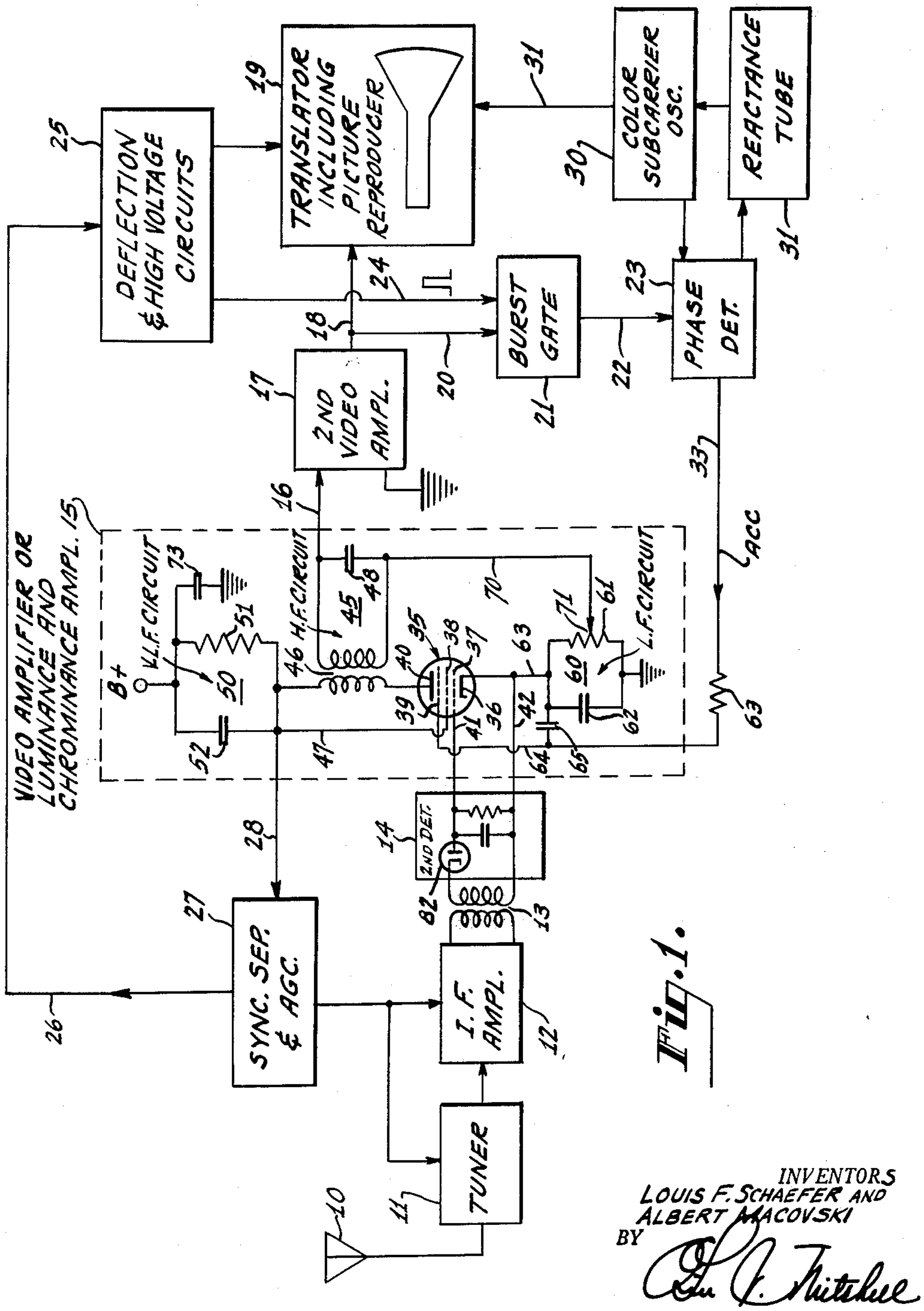
FIGURE 1 is a diagram of a color television receiver wherein the luminance and chrominance amplifier according to this invention is in circuit diagram form and the balance of the receiver is in block diagram form.

FIGURE 1 illustrates a color television receiver including a luminance and chrominance amplifier circuit according to this invention. A radio frequency color television signal received by antenna 10 is applied to a tuner 11 which includes a radio frequency amplifier, and a first detector. The intermediate frequency signal output of the tuner 11 is applied to an intermediate frequency amplifier 12. The output of the intermediate frequency amplifier 12 is coupled by means of a transformer 13 to a second detector circuit 14, which includes a diode rectifier 14. The detector circuit 14 serves to recover the video signals from the modulated intermediate frequency carrier as is conventional. The video signal output of the second detector 14 is coupled to the input of a video or luminance and chrominance amplifier circuit 15, the details of which will be described hereinafter. The video signal output of the video amplifier 15 is applied through a lead 16 to a second video amplifier 17. The amplified video signal is applied through a lead 18 to a translator 19, which includes a color picture reproducing device such as a kinescope. The amplified video signal of the second video amplifier 17 is also applied by means of a lead 20 to a burst gate 21. The color subcarrier bursts are separated from the video signal in the burst gate 21 and applied through a lead 22 to a phase detector 23. This is accomplished by applying a positive pulse by means of a lead 24 to the burst gate 21 immediately following each horizontal synchronizing pulse when color subcarrier bursts are present. The positive pulses are conveniently obtained from the conventional high voltage transformer (not shown) of the deflection and high voltage circuits 25. The deflection and high voltage circuits 25 are supplied, through a lead 26, with synchronizing pulses from a synchronizing pulse separator and AGC circuit 27. The synchronizing pulse separator portion of the circuit 27 separates the synchronizing pulses from the video signal, which is supplied to the circuit 27 through a lead 28 from the video amplifier 15. The automatic gain control portion of the circuit 27 supplies a voltage to the tuner 11 and the intermediate frequency amplifier 12 to automatically control the gains thereof.

The separated bursts applied through the lead 22 to the phase detector 23 are compared in the phase detector with the output signal of the color subcarrier oscillator 30. A correction voltage developed by the phase detector 23 is applied to a reactance tube circuit 31 having an output coupled to the oscillator 30 to maintain the oscillate signal in synchronism and phase with the received bursts. The output of the oscillator 30 is applied through the lead 31 to the translator 19. The translator 19 includes means to demodulate the modulated color subcarrier component of the video signal applied thereto from the second video amplifier to recover the color-mixture signals from the video signal. The translator circuit 19 also includes means for reproducing the color television picture such as a color kinescope, as is conventional.

An automatic chroma control voltage, which is obtained from the phase detector 23, is applied by means of a lead 33 to the video amplifier 15. The phase detector 23 provides an automatic chroma control voltage inversely proportional to the amplitude of the bursts. The phase detector 23 may be constructed according to FIGURE 15 on page 308 of the March 1956 issue of the Proceedings of the IRE.

It is thus apparent that the color television receiver shown in FIGURE 1 differs from receivers presently in common use in that it has a single video amplifier channel for amplifying both the luminance and chrominance signals, rather than having separate parallel channels for the luminance and chrominance signals, respectively. The video amplifier 15 shown within the dotted line box will now be described to show how the gain of the chrominance portion of the signal passed through the video amplifier 15 is controlled by the automatic chroma control voltage on lead 33, without affecting the gain of the luminance portion of the video signal.

The video amplifier 15 includes an amplifying device or pentode vacuum tube 35 having a common electrode or cathode 36, a first control electrode or control grid 37, a first output electrode or screen grid 38, a second control electrode or suppressor grid 39 and a second output electrode or anode 40. The video output signal of the second detector 14 is applied by means of the lead 41 to the control grid 37 and by means of the lead 42 to the cathode 36. This arrangement results in a cathode loaded or bootstrap circuit. The bootstrapping arrangement is possible because the second detector circuit 14 does not require that either of the output leads 41 or 42 be grounded.

A high frequency chrominance circuit 45 is coupled to the anode circuit of vacuum tube 35 by means of a transformer 46. The secondary winding of the transformer 46 is connected to the anode 40 and through the circuits 50 and 60 to the cathode 36. The capacitor 48 in the high frequency chrominance circuit 45 has a value to provide a resonant circuit with the inductance of the circuit, which circuit is resonant at the frequency of the high frequency or chrominance signal. The inductance in the circuit 45 provides a bypass for the low frequency luminance signal. Stated otherwise, the resonant circuit 45 is a very low impedance to the low frequency luminance signal and effectively is a short circuit to this signal. B+ potential is applied to the screen grid 38 and the anode 40 through a very low frequency circuit 50 consisting of a resistor 51 shunted by a capacitor 52. The capacitor 52 has such a value as to provide a bypass for the chrominance signals and for luminance signals above about one-half megacycle. According to color television standards in the United States, the chrominance signal has frequency components extending from about 2 or 3 megacycles to about 4.1 megacycles. The luminance signal has frequency components extending from zero to about 4.1 megacycles. Synchronizing pulses in the video signal consists mainly of frequency components below about one-half megacycle.

A low frequency luminance circuit 60 consists of a resistor 61 shunted by a capacitor 62. The value of the capacitor 62 is selected to provide a bypass for chrominance signals and to permit the developing of the low frequency luminance signals across the resistor 61. It will be understood that all of the luminance frequency components extending from zero to 4.1 megacycles are not developed across the low frequency luminance circuit 60, but rather only those frequencies extending from zero to about 2 or 2½ megacycles. The luminance signal frequency components between about 2½ and 4.1 megacycles appear across the high frequency chrominance circuit 45. In actual practice, no difficulty is encountered by treating signal components between 2.5 and 4.1 megacycles as chrominance signals having their gain controlled by an automatic chroma control voltage.

One end of the low frequency luminance circuit 60 is connected by lead 63 to the cathode 36. The other end of the low frequency luminance circuit 60 is connected to ground, and through ground, the radio frequency bypassed B+ supply, the very low frequency circuit 50, and through the lead 47 to the screen grid 38. Stated another way, the screen grid 38 is connected to a point intermediate the high frequency chrominance circuit 45 and the low frequency luminance circuit 60.

The automatic chroma control (ACC) voltage, which is derived from the phase detector 23, is applied through a resistor 63 and a lead 64 to the suppressor grid 39. A capacitor 65 is connected from the lead 64 to the cathode 36 to prevent the luminance signal developed across resistor 61 from modulating the automatic chroma control voltage. Stated another way, the ACC voltage on the lead 33 from the phase detector is referenced to ground, and the ACC voltage should be impressed across the suppressor grid 39 and the cathode 36. Therefore, the capacitor 65 and resistor 63 are employed to filter out the voltage variations on circuit 60 from the ACC input circuit.

The automatic chroma control voltage applied to the suppressor grid 39 causes a division of the electron stream within the vacuum tube 35 between the screen grid 38 and the anode 40. When a relatively negative voltage is supplied to the suppressor grid 39, the screen grid 38 draws all the current. When a high positive voltage is applied to the suppressor grid 39, the anode 40 draws almost all the current. At intermediate values of automatic chroma control voltage applied to the suppressor grid 39, the current divides between the screen grid and the anode in a corresponding ratio.

Current drawn by the anode 40 passes through both the high frequency chrominance circuit 45 and the low frequency luminance circuit 60, but the high frequency chrominance signal is developed solely across the high frequency chrominance circuit 45. Current drawn by the screen grid 38 passes through the low frequency luminance circuit 60 without going through the high frequency chrominance circuit 45. Therefore, the low frequency luminance signal developed across the low frequency circuit 60 is unaffected by the division of current drawn by the anode and screen grid. On the other hand, the chrominance developed across the high frequency circuit 45 is proportional to the anode current, which increases as the automatic chroma control voltage applied to the suppressor grid 39 increases in a positive direction. It is thus apparent that the automatic chroma control voltage applied to the suppressor grid 39 controls the amplitude of the high frequency chrominance signal in the circuit 45, without affecting the amplitude of low frequency luminance signal in the circuit 60.

The chrominance signal across the circuit 45 is combined with the luminance signal across the circuit 60 by means of a conductor 70 connected to a variable tap 71 on the resistor 61. The variable tap 71 provides a manual gain control for the luminance signal. The secondary coil of the transformer 46, which constitutes the inductance portion of the chrominance circuit 45, is poled to permit the addition of the signals in the circuits 45 and 60. The combined output of the circuits 45 and 60 is applied to the second video amplifier 17 by the lead 16 and the ground connection. It is apparent, that according to this invention, a single video amplifier is provided for amplifying both the chrominance and luminance signals, while permitting the gain of the amplifier for chrominance signals to be independently and automatically varied by means of an automatic chroma control voltage.

Figures 2, 3:
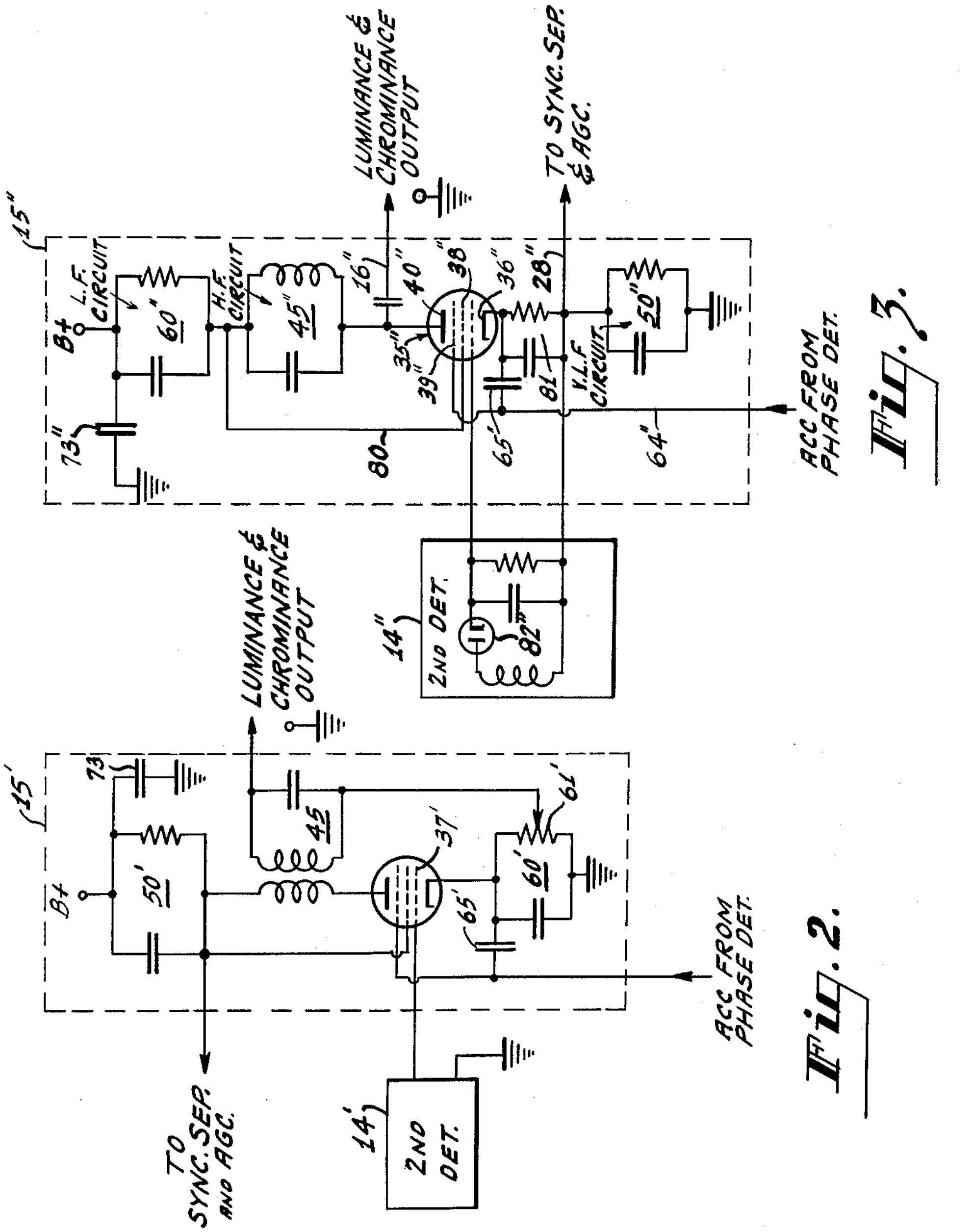
FIGURE 2 is a circuit diagram of a luminance and chrominance amplifier differing from the one in FIGURE 1 in that cathode loading or bootstrapping is not employed.
FIGURE 3 is a circuit diagram of another luminance and chrominance amplifier according to this invention.

FIGURE 2 shows a video amplifier circuit 15′ similar to amplifier 15 in FIGURE 1 but not providing bootstrap operation of the low frequency luminance circuit 60′ in the cathode circuit. In the arrangement shown in FIGURE 1, the video amplifier 15 amplifies the luminance signal. In the arrangement of FIGURE 2, the amplification of the luminance signal is less than one, that is the gain of the luminance amplifier is less than unity, because the output of the second detector 14′ is applied between the control grid 37′ and the grounded end of the low frequency luminance circuit 60′. The resistor 61′ therefore constitutes the cathode resistor of a cathode follower circuit. In other respects, the circuit of FIGURE 2 is the same as the circuit in FIGURE 1, and the same numerals are used with prime designations added. The circuit of FIGURE 2 is useful even though it does not amplify the luminance signal, because less amplification of the luminance signal is generally required compared with that required for the chrominance signal.

FIGURE 3 shows another video amplifier circuit 15″ which has the advantage that no transformer is needed to provide the polarity reversal accomplished by the transformer 46 in FIGURE 1. The transformer 46 is necessary in the arrangement of FIGURE 1 to provide the proper polarity of the high frequency chrominance signals in the circuit 45 such that they can be added to the low frequency luminance signal in circuit 60. In the circuit of FIGURE 3, the combined luminance and chrominance output is obtained directly on the anode 40″ by means of an output connection on the lead 16″. The high frequency chrominance circuit 45″ and the low frequency luminance circuit 60″ are connected in series in the anode circuit of the vacuum tube 35″. Both the luminance and chrominance signals are therefore, derived from the output lead 16.

Referring to FIGURE 3, it will be noted that the high frequency chrominance circuit 45″ is coupled from the anode 40″ through the low frequency luminance circuit 60″ and through the very low frequency circuit 50″ to the cathode 36″, and that the low frequency chrominance circuit 60″ is coupled from the screen grid 38″ (by a lead 80) through the B+ bypass capacitor 73″, through ground, through the very low frequency circuit 50″, and the cathode biasing circuit 81 to the cathode 36″. Like the arrangements previously described, the screen grid 38″ is connected to a point intermediate the high frequency chrominance circuit 45″ and the low frequency luminance circuit 60″. The automatic chroma control voltage applied by means of the lead 64″ to the suppressor grid 39″ causes a corresponding division of the current drawn by the screen grid 38″ and the anode 40″. The automatic chroma control voltage therefore controls the gain of the high frequency chrominance signal, without affecting the gain of the low frequency luminance signal, in the same manner as has been described in connection with FIGURE 1. The very low frequency signal (zero to about ½ mc.) available across the very low frequency circuit 50″ is derived from the lead 28″ and may be applied to the synchronizing pulse separator and AGC circuits of the receiver (not shown).

The synchronizing pulses of the signals from the second detector 14″ extend in the positive direction. This is accomplished by reversing the poling of the diode 82″ in the circuit compared with the poling of the diode 82 shown in FIGURE 1. The arrangement shown in FIGURE 1 is the usual one and provides a video output from the second detector 14 having negatively extending synchronizing pulses. The polarity of the diode 82″ in FIGURE 3 is as shown because of the phase reversal occurring in the vacuum tube 35″, in order to provide the desired sync negative output signal on the lead 16″. A sync negative signal is generally desired on lead 16 in FIGURE 1 and on lead 16″ in FIGURE 3 so that the polarity inversion in the following second chroma amplifier will provide a sync positive signal, suitable for application to the cathodes of a color kinescope. Both the high frequency chrominance signals and low frequency luminance signals are amplified in the arrangement of FIGURE 3 because both of the circuits 45″ and 60″ are in the anode circuit of the vacuum tube. The very low frequency signal developed across the very low frequency circuit 30″ is also amplified because the circuit 55′ is connected as a bootstrap circuit. As stated previously, the circuit of FIGURE 3 is advantageous because it does not require the transformer 46 of FIGURE 1 to perform a polarity reversing function.

It is apparent, that according to this invention, there are provided video amplifiers capable of simultaneously amplifying both the high frequency and low frequency portions of an input signal and which permit the gain of one portion of the signal to be controlled by a control voltage without affecting the gain of the other portion of the signal.

What is claimed is:

1. In a color television receiver including a source of composite color television signals comprising low frequency luminance signals and high frequency chrominance signals, the combination comprising an amplifier device having a pair of input electrodes, a pair of output electrodes and an additional electrode, said pair of input electrodes serving to supply a current of controllable magnitude to said pair of output electrodes, said additional electrode serving to control the division of said supplied current between said pair of output electrodes, means coupled to said source for applying said composite color television signals to said input electrodes, means including a load impedance for said low frequency luminance signal coupled to both of said pair of output electrodes for developing a low frequency luminance signal output in response to the current drawn by both of said pair of output electrodes, means including a load impedance for said high frequency chrominance signals coupled to one of said pair of output electrodes for developing a high frequency chrominance signal output in response to the current drawn by only said one output electrode, means coupled to said first named and second named load impedances for combining said low frequency luminance signal output and said high frequency chrominance signal output to provide a composite output signal, and means for varying the magnitude of the high frequency chrominance signal component of said composite output signal without substantially varying the amplitude of the low frequency luminance signal component of said composite output signal, said last named means comprising means for varying the potential of said additional electrode to vary the division of supplied current between said pair of output electrodes.

2. In a color television receiver including a source of composite color television signals comprising low frequency luminance signal components and high frequency chrominance signal components, and also including a source of an automatic chroma control voltage representative of undesired variations of said high frequency chrominance signal components, the combination comprising an amplifier device having a pair of input electrodes, a pair of output electrodes and an additional electrode, said pair of input electrodes serving to supply a current of controllable magnitude to said pair of output electrodes, said additional electrode serving to control the division of said supplied current between said pair of output electrodes, means coupled to said source for applying said composite color television signals to said input electrodes, means including a load impedance for said low frequency luminance signal components coupled to both of said pair of output electrodes for developing a low frequency luminance signal output in response to the current drawn by both of said pair of output electrodes, means including a load impedance for said high frequency chrominance signal components coupled to one of said pair of output electrodes for developing a high frequency chrominance signal output in response to the current drawn by only said one output electrode, means coupled to said first named and second named load impedances for combining said low frequency luminance signal output and said high frequency chrominance signal output to provide a composite output signal, and means for causing the high frequency chrominance signal component of said composite output signal to be substantially free of said undesired variations, said last named means comprising means coupled to said automatic chroma control source for applying said control voltage to said additional electrode to vary the division of current drawn by said pair of output electrodes.

3. In a color television receiver, a video amplifier for amplifying the low frequency luminance signal component and high frequency chrominance and color subcarrier burst signal components of a composite television signal comprising, a vacuum tube having a cathode, a control grid, a screen grid, a suppressor grid and an anode, means for applying said composite color television signal to said control grid, a load for said low frequency luminance signal component coupled between said screen grid and said cathode, said low frequency luminance signal load being effectively by-passed for the frequencies of said high frequency chrominance signal component, a load for said high frequency chrominance signal component coupled from said anode through said low frequency luminance signal load to said cathode, means for applying an automatic chroma control voltage to said suppressor grid to vary the division of current drawn by said anode and screen grid, and means for deriving output signals from said high frequency and low frequency loads.

4. In a color television receiver, a video amplifier for amplifying the low frequency luminance signal component and high frequency chrominance and color subcarrier burst signal components of a composite color television signal, comprising, a vacuum tube having a cathode, a control grid, a screen grid, a suppressor grid and an anode, means for applying said composite color television signal to said control grid, a load for said low frequency luminance signal component coupled between said screen grid and said cathode, said low frequency luminance signal load being effectively bypassed for the frequencies of said high frequency chrominance signal component a load for said high frequency chrominance signal component coupled from said anode through said low frequency luminance signal load to said cathode, means for applying an automatic chroma control voltage to said suppressor grid to vary the division of current drawn by said anode and screen grid, means for deriving output signals from said high frequency and low frequency loads, and means to derive a combined output signal from said high frequency and low frequency loads.

5. In a color television receiver, a video amplifier for amplifying both low frequency luminance signals and high frequency chrominance and color subcarrier burst signals, comprising, a vacuum tube having a cathode, a control grid, a screen grid, a suppressor grid and an anode, means for applying a video input signal comprising both said low frequency luminance signals and said high frequency chrominance and color subcarrier burst signals to said control grid, a load for said low frequency luminance signals coupled between said screen grid and said cathode, a load for said high frequency chrominance and color subcarrier burst signals coupled from said anode through said low frequency luminance signal load to said cathode whereby the current drawn by said green grid passes solely through said low frequency luminance signal load and the current drawn by said anode passes through both the high frequency chrominance signal load and low frequency luminance signal load, means for applying an automatic chroma control voltage to said suppressor grid to vary the division of current drawn by said anode and screen grid to control the amplitude of the chrominance signal in said high frequency chrominance signal load without affecting the amplitude of the luminance signal in said low frequency luminance signal load, and means for deriving a combined output signal from said high frequency chrominance signal load and said low frequency luminance signal load.

6. In a color television receiver, a video amplifier for amplifying both low frequency luminance signals including very low frequency synchronizing pulses and high frequency chrominance and color subcarrier burst signals, comprising, a vacuum tube having a cathode, a control grid, a screen grid, a suppressor grid and an anode, means for applying a video input signal comprising said low frequency luminance signals and said high frequency chrominance and color subcarrier burst signals to said control grid, a low frequency luminance signal load and a very low frequency synchronizing pulse take-off circuit coupled in series between said screen grid and cathode, a high frequency chrominance signal load coupled between said anode and said screen grid, means interposed in said coupling between screen grid and cathode for applying energizing potentials to said screen and said anode such that only current drawn by said anode passes through said high frequency chrominance signal load whereas current drawn by both said anode and said screen grid passes through said low frequency luminance signal load and said very low frequency synchronizing pulse take-off circuit, means for applying an automatic chroma control voltage to said suppressor grid to vary the division of current drawn by said anode and screen grid to control the amplitude of the chrominance signal in said high frequency chrominance signal load without affecting the amplitude of the luminance signal in said low frequency chrominance signal load, means for deriving a combined output signal from said high frequency and low frequency loads, and means for deriving a synchronizing pulse output from said very low frequency synchronizing pulse take-off circuit.

7. In a color television receiver, a video amplifier for amplifying both low frequency luminance signals and high frequency chrominance signals, comprising, a vacuum tube having a cathode, a control grid, a screen grid, a suppressor grid and an anode, means for applying a video signal comprising both said low frequency luminance signals and said high frequency chrominance signals to said control grid, a first load impedance presenting a relatively high impedance to said low frequency luminance signals and a relatively low impedance to said both frequency chrominance signals and coupled in series with a second load impedance presenting a relatively high impedance to said high frequency chrominance signals and a relatively low impedance to said low frequency luminance signals to form the series combination, said series combination being coupled in series with the cathode-anode discharge path of said vacuum tube, a connection from said screen grid to said series combination at a point intermediate said first and second load impedances, said second load impedance of said series combination being positioned between said anode and said screen grid connection point so that current drawn by said screen grid passes solely through said first load impedance and current drawn by said anode passes through both said first and second load impedances means for applying an automatic chroma control voltage to said suppressor grid to vary the division of current drawn by said anode and said screen grid, and means for deriving a combined output signal from said first and second load impedances.

8. In a color television receiver, a video amplifier for amplifying both low frequency luminance signals and high frequency chrominance signals, comprising, a vacuum tube having a cathode, a control grid, a screen grid, a suppressor grid and an anode, means for applying a composite video signal including both low frequency luminance signals and high frequency chrominance signals to said control grid, said low frequency luminance signals including synchronizing pulses, first and second load impedance for said low frequency luminance signals and a third load impedance for said high frequency chrominance signal coupled in series to form a series combination in shunt with the cathode-anode discharge path of said vacuum tube, a connection from said screen grid to said series combination at a point intermediate said second and third load impedances, said third load impedance of said series combination being positioned between said anode and said screen grid connection point so that current drawn by said screen grid passes solely through said first and second load impedances and current drawn by said anode passes through said first, second and third load impedances means for applying an automatic chroma control voltage to said suppressor grid to vary the division of current drawn by said anode and said screen grid, means for deriving a combined output signal from said second and third load impedances, and means for deriving a separate synchronizing pulse output from said first load impedance.

9. An amplifier comprising, a vacuum tube having a cathode, a control grid, a screen grid, a suppressor grid and an anode, means for applying an input signal containing high and low frequency components to said control grid, a first load impedance presenting a relatively high impedance to said low frequency components and a relatively low impedance to said high frequency components and a second load impedance presenting a relatively high impedance to said high frequency components and a relatively low impedance to said low frequency components, said first and second load impedances being coupled in series to form a series combination in shunt with the cathode-anode discharge path of said vacuum tube, a connection from said screen grid to said series combination at a point intermediate said first and second load impedances, said second load impedance of said series combination being positioned between said anode and said screen grid connection point so that current drawn by said screen grid passes solely through said first load impedance and current drawn by said anode passes through both said first and second load impedances means for applying a control voltage to said suppressor grid to vary the division of current drawn by said anode and said screen grid and to thereby vary the amplitude of the high frequency components appearing across said second load impedance without appreciably varying the amplitude of low frequency components appearing across said first load impedance, and means for deriving a combined output signal from said first and second load impedances.

References Cited in the file of this patent

UNITED STATES PATENTS

| | | |
|---|---|---|
| 2,243,401 | Sturley | May 27, 1941 |
| 2,734,940 | Loughlin | Feb. 14, 1956 |
| 2,752,431 | Goodrich | June 26, 1956 |
| 2,798,900 | Bradley | July 8, 1957 |
| 2,910,528 | Petersen | Oct. 27, 1959 |

FOREIGN PATENTS

| | | |
|---|---|---|
| 656,929 | Great Britain | Sept. 5, 1951 |
| 724,941 | Great Britain | Feb. 23, 1955 |